United States Patent
Nabetani et al.

(10) Patent No.: US 9,565,644 B2
(45) Date of Patent: Feb. 7, 2017

(54) WIRELESS COMMUNICATION APPARATUS

(71) Applicant: KABUSHIKI KAISHA TOSHIBA, Minato-ku, Tokyo (JP)

(72) Inventors: Toshihisa Nabetani, Kawasaki (JP); Kiyoshi Toshimitsu, Shibuya-ku (JP); Tomoko Adachi, Shinagawa-ku (JP); Ryoko Matsuo, Shinagawa-ku (JP); Tatsuma Hirano, Katsushika-ku (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 14/854,202

(22) Filed: Sep. 15, 2015

(65) Prior Publication Data
US 2016/0007305 A1    Jan. 7, 2016

Related U.S. Application Data

(63) Continuation of application No. 14/162,887, filed on Jan. 24, 2014, now Pat. No. 9,198,196, which is a
(Continued)

(30) Foreign Application Priority Data

Mar. 24, 2008 (JP) ................. 2008-075222

(51) Int. Cl.
*H04W 56/00* (2009.01)
*H04W 74/02* (2009.01)
(Continued)

(52) U.S. Cl.
CPC ............. *H04W 56/00* (2013.01); *H04W 74/02* (2013.01); *H04W 74/0808* (2013.01); *H04W 84/12* (2013.01); *H04W 88/02* (2013.01)

(58) Field of Classification Search
None
See application file for complete search history.

(56) References Cited

U.S. PATENT DOCUMENTS

2002/0181492 A1    12/2002    Kasami et al.
2004/0008627 A1*    1/2004    Garg .................. H04L 12/5695
                                                                    370/235

(Continued)

FOREIGN PATENT DOCUMENTS

| JP | 2002-156253 | 5/2002 |
| JP | 2003-052079 | 2/2003 |

(Continued)

OTHER PUBLICATIONS

IEEE Standard for Wireless LANs, IEEE Std. 802.11e-2005, Chapter 9.

(Continued)

*Primary Examiner* — Diane Lo
(74) *Attorney, Agent, or Firm* — Foley & Lardner LLP

(57) ABSTRACT

A wireless communication apparatus includes a transmitter that transmits a first frame and a second frame with multiplexing and a receiver that receives a third frame sent in response to the first frame and a forth frame sent in response to the second frame, wherein a first receipt completion timing at which the third frame is fully received by the receiver and a second receipt completion timing at which the forth frame is fully received by the receiver are synchronized by controlling at least one of first content of the first frame, a first transmission method by which the first frame is sent, second content of the second frame and a second transmission method by which the second frame is sent.

20 Claims, 10 Drawing Sheets

Related U.S. Application Data continuation of application No. 12/402,699, filed on Mar. 12, 2009, now Pat. No. 8,675,633.

(51) Int. Cl.
*H04W 74/08* (2009.01)
*H04W 88/02* (2009.01)
*H04W 84/12* (2009.01)

(56) References Cited

U.S. PATENT DOCUMENTS

| | | |
|---|---|---|
| 2005/0141495 A1 | 6/2005 | Lin et al. |
| 2005/0147023 A1 | 7/2005 | Stephens et al. |
| 2006/0018332 A1 | 1/2006 | Kakani et al. |
| 2006/0195629 A1* | 8/2006 | Sharma .............. H04L 1/1685 710/30 |
| 2007/0104171 A1 | 5/2007 | Kasami et al. |
| 2007/0291913 A1 | 12/2007 | Trainin |

FOREIGN PATENT DOCUMENTS

| | | |
|---|---|---|
| JP | 2005-102136 | 4/2005 |
| JP | 2007-517474 | 6/2007 |
| JP | 5305703 | 10/2013 |
| WO | 2005/067169 | 7/2005 |

OTHER PUBLICATIONS

Japanese Office Action for Japanese Application No. 2008-075222 issued on Jun. 15, 2012.
IEEE Standard for Wireless LANs, IEEE Std. 802.11e-2005, Part 11, Amendment 8, Sep. 2005, New York, New York.
Draft Standard for Wireless LANs, prepared by the 802.11 Working Group of the 802 committee, 2006, New York, New York.
Non-Final Office Action for U.S. Appl. No. 12/402,699 dated Oct. 18, 2011, 50 pages.
Final Office Action for U.S. Appl. No. 12/402,699 dated Apr. 18, 2012, 53 pages.
Non-Final Office Action for U.S. Appl. No. 12/402,699 dated Mar. 7, 2013, 56 pages.
Final Office Action for U.S. Appl. No. 12/402,699 dated Aug. 16, 2013, 49 pages.
Non-Final Office Action for U.S. Appl. No. 14/162,887 dated Jan. 30, 2015, 34 pages
Office Action of Notification of Reasons for Refusal for Japanese Patent Application No. 2013-131477 Dated Mar. 28, 2014, 4 pgs.
Japanese Office Action dated Mar. 25, 2016 issued in corresponding Japanese Application No. 2014-232998 and its English translation thereof.

* cited by examiner

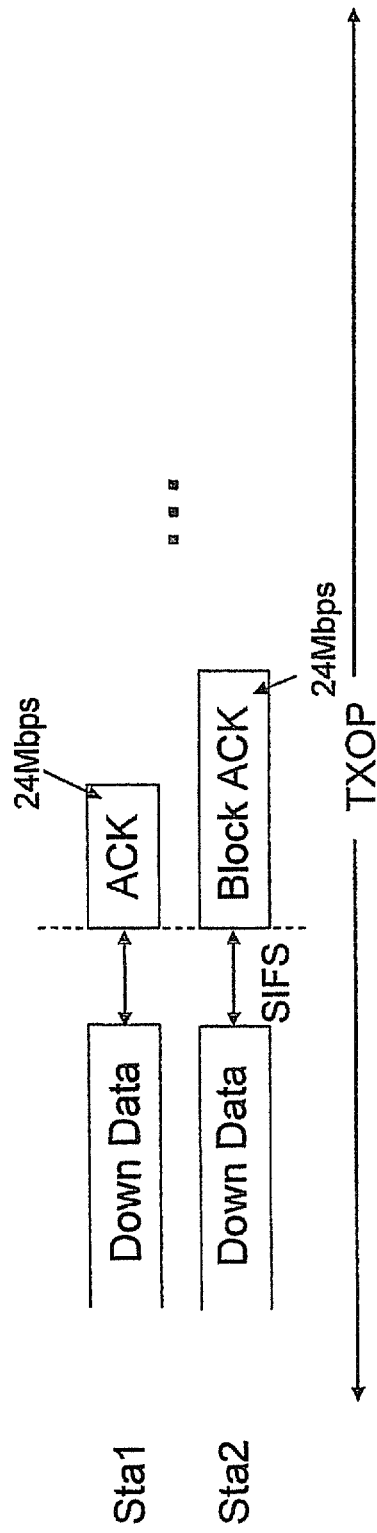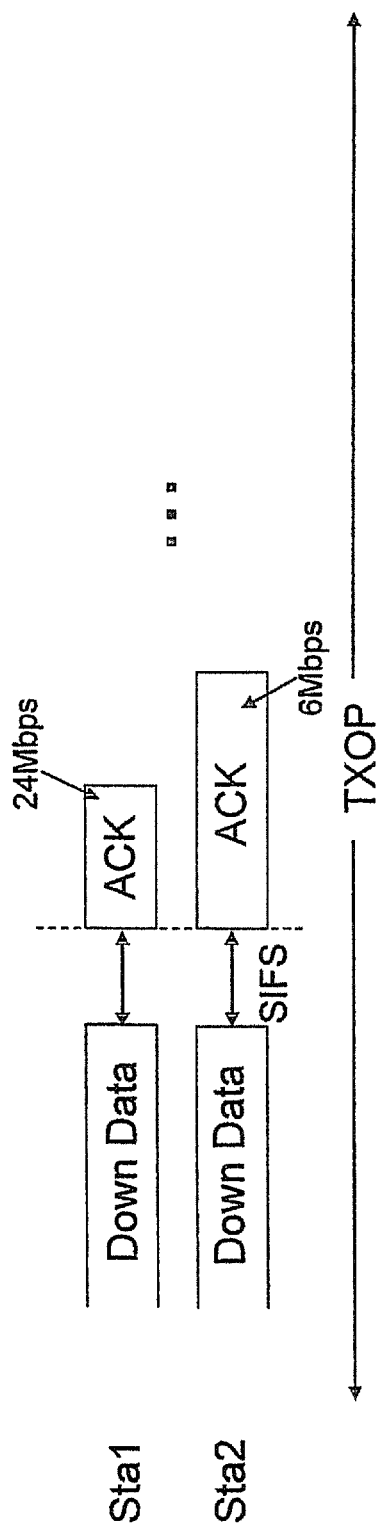

EXAMPLE OF TRANSMISSION CONTROL BASED ON "NORMAL ACK" AS UNIFIED ACK POLICY

EXAMPLE OF TRANSMISSION CONTROL BASED ON "BLOCK ACK (COMPRESSED BLOCK ACK)" AS UNIFIED ACK POLICY

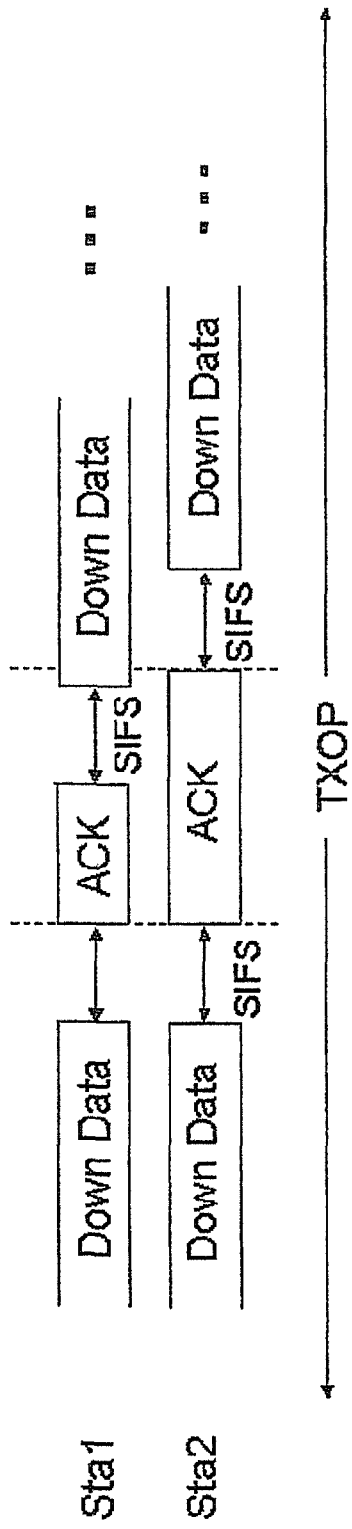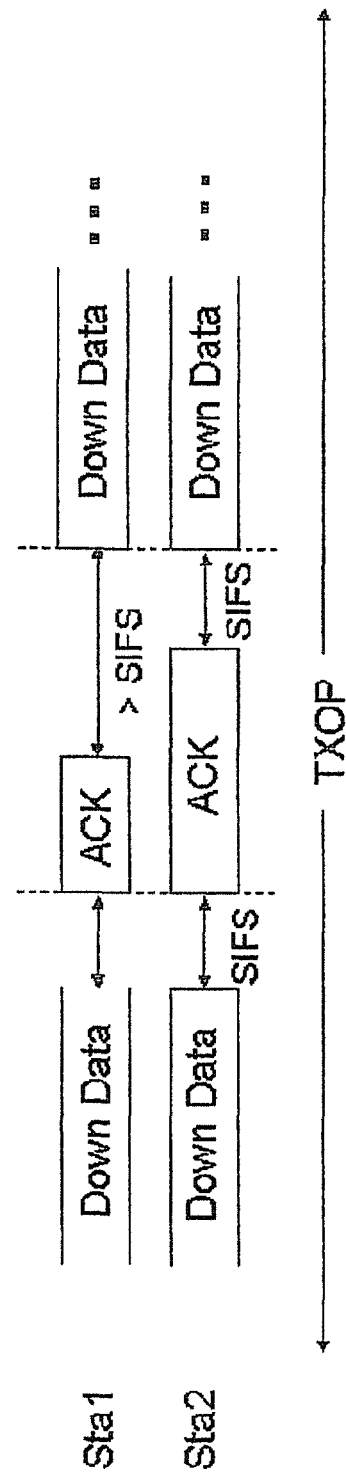

WIRELESS COMMUNICATION APPARATUS

CROSS REFERENCE TO RELATED APPLICATION(S)

This application is a Continuation of U.S. patent application Ser. No. 14/162,887 filed Jan. 24, 2014, which is a Continuation of U.S. patent application Ser. No. 12/402,699 filed Mar. 12, 2009, the entire contents of both of which are incorporated herein by reference.

The present disclosure relates to the subject matters contained in Japanese Patent Application No. 2008-075222 filed on Mar. 24, 2008, which are incorporated herein by reference in its entirety.

FIELD

The present invention relates to a wireless communication apparatus and a method and program for controlling the wireless communication apparatus.

BACKGROUND

CSMA/CA (Carrier Sense Multiple Access with Collision Avoidance) is used in IEEE802.11 which is a typical standard for communication used in a wireless LAN.

In CSMA/CA, each wireless communication apparatus transmits a data frame after performing carrier sensing to confirm that a channel to be used is being unused (idle) for more than a predetermined time period.

When a wireless communication apparatus receives the data frame properly, the wireless communication apparatus returns a receipt confirmation frame after a predetermined period (an SIFS (Short Inter Frame Space)) to notify the data frame sender of the normal receipt of the data frame. The receipt confirmation frame may be an ACK frame, a Block ACK frame, or a CTS frame. The wireless communication apparatus on the receiver side answers with the receipt confirmation frame which varies according to the type of the received data frame.

SDM (Space Division Multiplexing) is known as one of wireless communication systems. In SDM, a wireless communication apparatus on the sender side forms directional radio waves by using an adaptive array antenna or the like and transmits (spatially multiplexes) different radio waves to a plurality of wireless communication apparatuses simultaneously and with one and the same frequency. That is, in SDM, a wireless communication apparatus on the sender side (e.g. an access point device) can transmit different data frames to a plurality of wireless terminals respectively, simultaneously and with one and the same frequency.

When SDM is used in an IEEE802.11 standard-based wireless LAN system, there is however a possibility of occurrence of a situation where the access point device may receive a receipt confirmation frame from another wireless terminal while the access point device is transmitting a data frame to one wireless terminal. This situation is referred to as a "collision."

The situation how the collision occurs will be described below.

First, the access point device starts transmission of different data frames to a plurality of wireless terminals simultaneously and with one and the same frequency by SDM. When the size of a data frame to be transmitted to one wireless terminal STA1 is large compared with the sizes of data frames to be transmitted to other wireless terminals, the access point device may terminate transmission of the data frames to the other wireless terminals than the wireless terminal STA1 while the access point device transmits the data frame to the wireless terminal STA1. Because the other wireless terminals than the wireless terminal STA1 return receipt confirmation frames, there is a possibility of occurrence of a situation (collision) that the access point device may receive the receipt confirmation frames from the other wireless terminals than the wireless terminal STA1 though the access point device is transmitting the data frame to the ratio terminal STA1. As described above, when SDM is used in an IEEE802.11 standard-based wireless LAN system, there is a problem that the access point device cannot receive any receipt confirmation frame.

As a method to solve this problem, there has been disclosed a technique in which the return start timings of receipt confirmation frames from a plurality of wireless terminals are synchronized when different data frames are transmitted to the plurality of wireless terminals simultaneously and with one and the same frequency by SDM. An example of such technique is disclosed in the following document (1).

US 2005/0147023 A1 (1)

In the technique disclosed in the document (1), occurrence of collision can be prevented even when SDM is employed in a wireless LAN system compliant with the IEEE802.11 standard.

As shown in FIG. 9, the IEEE802.11e standard which is an enhanced IEEE802.11 MAC layer protocol allows data frames to be transmitted continuously on an exclusively used channel during a period called TXOP (Transmission Opportunity) after the authorization of data frame transmission is acquired once.

During the TXOP period, any number of data frames is allowed to be transmitted continuously at intervals of SIFS, as described in the following document (2).

"Wireless LAN Medium Access Control (MAC) and Physical Layer (PHY) specifications, Medium Access Control (MAC) Quality of Service (QoS) Enhancements", IEEE Std. 802.11e-2005 (2)

In the technique described in the document (2), because it is unnecessary to acquire the authorization of data frame transmission again whenever a data frame is transmitted, the overhead (AIFS (Arbitration Short Inter Frame Space) and backoff period) required for acquiring the authorization of data frame transmission can be reduced to achieve improvement in throughput and system capacity.

As described above, in the technique disclosed in the document (1), even when SDM is employed in the IEEE802.11 standard, occurrence of collision can be suppressed by synchronizing the timings of receipt confirmation frames returned from the respective wireless terminals.

However, when SDM is employed in the technique disclosed in the document (2), that is, in the technique in which data frames are transmitted continuously during the period of TXOP defined in IEEE802.11e, the following problem occurs.

Assume now that an access point device transmits data frames continuously to a plurality of wireless terminals simultaneously and with one and the same frequency during the TXOP period. The access point device transmits next data frames without carrier sensing again when an SIFS has passed after reception of receipt confirmation frames as replies to the transmitted data frames from the plurality of wireless terminals.

The receipt confirmation frames are various in terms of type and size. The transfer rate in transmission of a receipt confirmation frame to the access point device varies according to each wireless terminal. For this reason, even when the timings of returning receipt confirmation frames from the plurality of wireless terminals are synchronized by the technique disclosed in the document (1), the time required for completion of the access point device's reception of a receipt confirmation frame returned from each wireless terminal (the time required for delivery of a frame (hereinafter referred to as frame time length)) varies.

Although the access point device transmits a next data frame when the SIFS has passed after reception of a receipt conformation frame, the time point of transmission start of the next data frame varies because the time required for completion of reception of the receipt conformation frame varies.

For this reason, when the time length difference between a receipt confirmation frame from the wireless terminal STA1 and a receipt confirmation frame from the wireless terminal STA2 exceeds the SIFS as shown in FIG. 10A, transmission of a next data frame to the wireless terminal STA1 is started though reception of the receipt confirmation frame the wireless terminal STA2 is not completed. There is a problem that collision occurs.

On the other hand, if transmission of a next data frame is intended to be started when a predetermined time (SIFS) has passed after completion of reception of the latest receipt confirmation frame as shown in FIG. 10B, the channel seems free for the SIFS to the wireless terminal (the wireless terminal STA2 in FIG. 10B) returning the receipt confirmation frame latest in terms of reception in the access point device but the channel seems free for a period longer than the SIFS to the other wireless terminal (the wireless terminal STA1 in FIG. 10B) than the wireless terminal returning the receipt confirmation frame latest in terms of reception in the access point device. For this reason, there is a possibility that the other wireless terminal than the wireless terminal returning the receipt confirmation frame latest in terms of reception in the access point device will acquire the authorization of transmission even when the access point device is continuously transmitting data frames.

In such a case, data frames transmitted continuously by the access point device collide with a data frame transmitted by the wireless terminal which acquires the authorization of transmission because the channel is free for a period longer than the SIFS. There is hence a problem that the access point device cannot transmit data frames continuously at intervals of the SIFS during the TXOP period.

As described above, in the IEEE802.11-based wireless LAN system, when the access point device transmits spatially multiplexed data frames to a plurality of wireless terminals and transmits such data frames continuously at intervals of the SIFS during the TXOP period, there is a problem that collision will occur because the transmission timing of a data frame to one wireless terminal overlaps with the reception timing of a receipt confirmation frame from any other wireless terminal.

For this reason, there is a problem that MAC efficiency cannot be improved because the concept of TXOP (the technique for transmitting data frames continuously at intervals of the SIFS during the TXOP period) cannot be applied to the case where SDM is used in the IEEE802.11-based wireless LAN system for spatially multiplexing and transmitting data frames.

SUMMARY

According to a first aspect of the present invention, there is provided a wireless communication apparatus including: a communication module configured to wirelessly communicate with a first counterpart communication apparatus and a second counterpart communication apparatus through a wireless channel during a period in which the wireless channel is allowed to be exclusively used; and a controller configured to control the communication module, wherein the communication module multiplexes a first data frame and a second data frame and transmits the first data frame to the first counterpart communication apparatus with a first transmission method and the second data frame to the second counterpart communication apparatus with a second transmission method, wherein the communication module completes receiving a first receipt confirmation frame being sent from the first counterpart communication apparatus with a first returning method at a first receipt completion timing and a second receipt confirmation frame from the second counter apparatus with a second returning method at a second receipt completion timing, wherein the first receipt confirmation frame and the first returning method are determined based on the first data frame and the first transmission method, wherein the second receipt confirmation frame and the second returning method are determined based on the second data frame and the second transmission method, wherein the controller controls the communication module to transmit the first data frame in the first transmission method and the second data frame in the second transmission method so as to synchronize the first receipt completion timing and the second receipt completion timing, and wherein the communication module transmits a next first data frame and a next second data frame after elapse of a given time from the first receipt completion timing and the second receipt completion timing.

According to a second aspect of the present invention, there is provided a wireless communication apparatus including: a communication module configured to wirelessly communicate with a first counterpart communication apparatus and a second counterpart communication apparatus through a wireless channel during a period in which the wireless channel is allowed to be exclusively used; and a generation module configured to generate notification information for controlling the first counterpart communication apparatus and the second counterpart communication apparatus to synchronize a first receipt completion timing, at which the communication module completes receiving a first receipt confirmation frame being sent from the first counterpart communication apparatus, and a second receipt completion timing, at which the communication module completes receiving a second receipt confirmation frame being sent from the second counterpart communication apparatus, wherein the communication module multiplexes a first data frame and a second data frame and transmits the first data frame to the first counterpart communication apparatus and the second data frame to the second counterpart communication apparatus while transmitting the notification information to the first counterpart communication apparatus and the second counterpart communication apparatus, wherein the communication module transmits a next first data frame and a next second data frame after elapse of a given time from the first receipt completion timing and the second receipt completion timing.

According to a third aspect of the present invention, there is provided a wireless communication apparatus including: a communication module configured to wirelessly communicate with a first counterpart communication apparatus and a second counterpart communication apparatus through a wireless channel during a period in which the wireless channel is allowed to be exclusively used, wherein the communication module multiplexes a first data frame and a second data frame and transmits the first data frame to the first counterpart communication apparatus and the second data frame to the second counterpart communication apparatus, wherein the communication module completes receiving a first receipt confirmation frame being sent from the first counterpart communication apparatus at a first receipt completion timing and a second receipt confirmation frame from the second counter apparatus at a second receipt completion timing, the second receipt completion timing being in synchronization with the first receipt completion timing, and wherein the communication module transmits a next first data frame and a next second data frame after elapse of a given time from the first receipt completion timing and the second receipt completion timing.

According to a fourth aspect of the present invention, there is provided a wireless communication apparatus including: a communication module configured to wirelessly communicate with a first counterpart communication apparatus and a second counterpart communication apparatus through a wireless channel during a period in which the wireless channel is allowed to be exclusively used, wherein the communication module multiplexes a first data frame and a second data frame and transmits the first data frame to the first counterpart communication apparatus and the second data frame to the second counterpart communication apparatus, wherein the communication module completes receiving a first receipt confirmation frame being sent from the first counterpart communication apparatus at a first receipt completion timing and a second receipt confirmation frame from the second counter apparatus at a second receipt completion timing, and wherein the communication module transmits a next first data frame and a next second data frame after elapse of a given time from the first receipt completion timing and the second receipt completion timing when the first receipt completion timing and the second receipt completion timing are in synchronization with each other.

According to a fifth aspect of the present invention, there is provided a method for controlling a wireless communication apparatus configured to wirelessly communicate with a first counterpart communication apparatus and a second counterpart communication apparatus through a wireless channel during a period in which the wireless channel is allowed to be exclusively used, the method including: multiplexing a first data frame and a second data frame; transmitting the first data frame to the first counterpart communication apparatus and the second data frame to the second counterpart communication apparatus; complete receiving a first receipt confirmation frame being sent from the first counterpart communication apparatus at a first receipt completion timing and a second receipt confirmation frame from the second counter apparatus at a second receipt completion timing, the second receipt completion timing being in synchronization with the first receipt completion timing, and transmitting a next first data frame and a next second data frame after elapse of a given time from the first receipt completion timing and the second receipt completion timing.

According to a sixth aspect of the present invention, there is provided a computer-readable storage medium containing a program for causing a wireless communication apparatus to operate in accordance with a sequence of procedure, the wireless communication apparatus being configured to wirelessly communicate with a first counterpart communication apparatus and a second counterpart communication apparatus through a wireless channel during a period in which the wireless channel is allowed to be exclusively used, the procedure including: multiplexing a first data frame and a second data frame; transmitting the first data frame to the first counterpart communication apparatus and the second data frame to the second counterpart communication apparatus; complete receiving a first receipt confirmation frame being sent from the first counterpart communication apparatus at a first receipt completion timing and a second receipt confirmation frame from the second counter apparatus at a second receipt completion timing, the second receipt completion timing being in synchronization with the first receipt completion timing; and transmitting a next first data frame and a next second data frame after elapse of a given time from the first receipt completion timing and the second receipt completion timing.

BRIEF DESCRIPTION OF THE DRAWINGS

A general configuration that implements the various feature of the invention will be described with reference to the drawings. The drawings and the associated descriptions are provided to illustrate embodiments of the invention and not to limit the scope of the invention.

FIGS. 4A and 4B are views showing frames exchanged between the access point device and a plurality of wireless terminals.

FIGS. 10A and 10B are views showing frames exchanged between the access point device and the plurality of wireless terminals.

DETAILED DESCRIPTION OF THE EMBODIMENTS

Hereinafter, embodiments of the invention will be described with reference to the accompanying drawings.

First Embodiment

Figure 1:
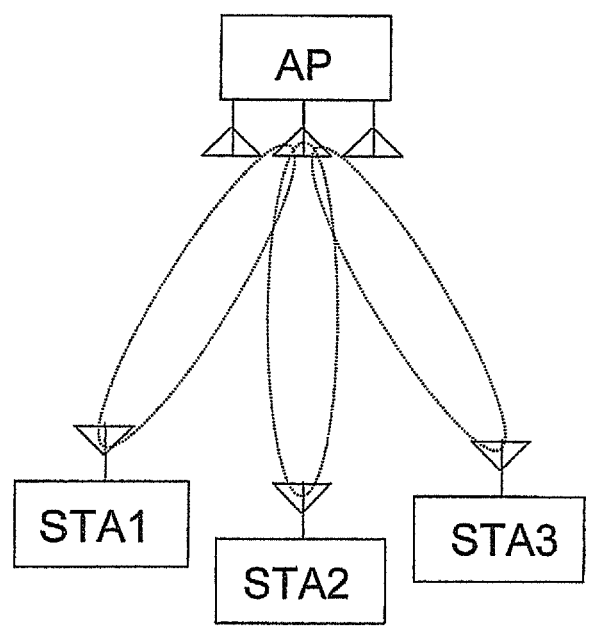
FIG. 1 is a diagram showing a wireless system according to a first embodiment of the invention.

FIG. 1 is a diagram showing a wireless system according to a first embodiment of the invention. The wireless system is compliant with the IEEE802.11e (including IEEE802.11a, IEEE802.11b and IEEE802.11n) standard. SDM (Spatial Division Multiplexing) is used in the wireless system.

The wireless system according to the first embodiment includes an access point device AP, and wireless terminals STA1 to STA3. Wireless communication between the access point device AP and each of the wireless terminals STA1 to STA3 is performed by SDM. The access point device AP transmits data frames continuously during a TXOP period as defined in IEEE802.11e.

The access point device AP creates radio waves with directivity (hereinafter referred to as directional beams) by using an adaptive array antenna. The access point device AP creates the directional beams so that the directional beams to be transmitted to the wireless terminals STA1 to STA3 respectively do not interfere with one another. The access point device AP transmits the created directional beams spatially multiplexed with data frames to the wireless terminals STA1 to STA3 respectively, simultaneously and on one and the same frequency channel (hereinafter referred to as SDM-transmission).

The number of directional beams created by the access point device AP, that is, the number of wireless terminals with which the access point device AP communicates simultaneously by radio by SDM may be any integer not smaller than 2.

Figure 2:
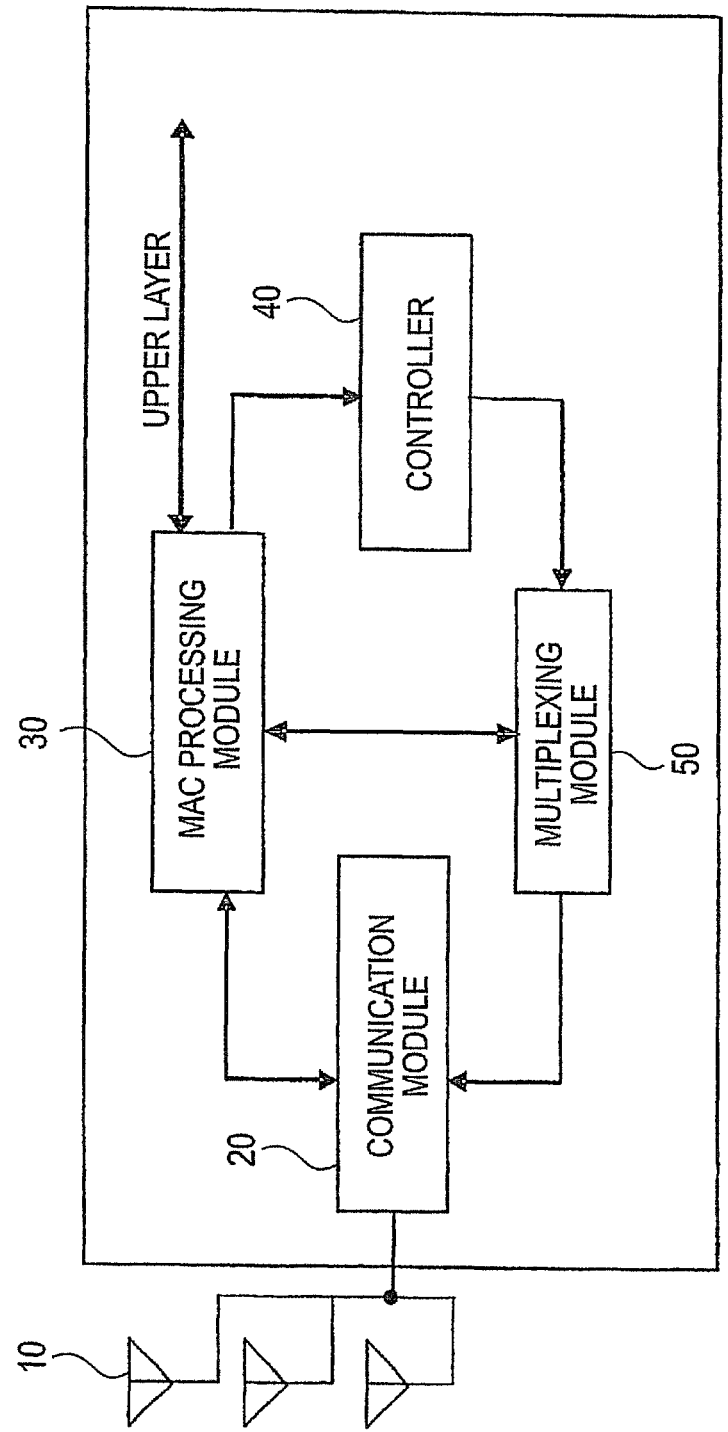
FIG. 2 is a block diagram showing the configuration of an access point device according to the first embodiment of the invention.

FIG. 2 is a block diagram showing the configuration of the access point device AP according to the first embodiment.

The access point device AP has an antenna module 10, a communication module 20, a MAC processing module 30, a controller 40, and a multiplexing module 50.

The antenna module 10 includes a plurality of antenna elements so that directional beams can be created.

The communication module 20 performs reception processing such as demodulation to a signal received from another wireless terminal through the antenna module 10. The communication module 20 performs transmission processing such as modulation to a transmission signal to be transmitted to another wireless terminal.

The MAC processing module 30 performs processing concerned with a MAC layer in accordance with the IEEE802.11 (including IEEE802.11e) standard MAC protocol.

The controller 40 performs data frame control and transmission method control for data frames to be transmitted by SDM.

The multiplexing module 50 performs processing for data frames to be transmitted to a plurality of wireless terminals simultaneously and on one and the same frequency channel, for example, processing such as weight matrix calculation for creation of directional beams (hereinafter referred to as multiplexing).

The communication module 20 performs transmission processing for simultaneous transmission of data frames to a plurality of wireless terminals and performs reception processing for simultaneous reception of data from a plurality of wireless terminals by SDM. It is therefore preferable that the transmission processing and reception processing in the communication module 20 are performed as parallel processing.

Although the access point device AP shown in FIG. 2 has been described on the assumption that the communication module 20 performs transmission processing after the multiplexing module 50 performs processing for data frames to be SDM-transmitted, the access point device AP may be configured so conversely that the multiplexing module 50 performs processing after the communication module 20 performs transmission processing.

An operation when the access point device AP SDM-transmits data frames to the wireless terminals STA1 to STA3 will be described below.

First, data frames each having a transmission request in processing concerned with an upper layer are stored in a built-in transmission buffer (not shown) included in the MAC processing module 30.

Then, the access point device AP acquires the authorization of transmission by carrier sensing in accordance with the IEEE802.11 standard MAC protocol.

Then, the controller 40 takes data frames to be transmitted to the wireless terminals STA1 to STA3 out of the built-in transmission buffer of the MAC processing module 30 and determines a transmission method for each data frame.

Then, the multiplexing module 50 performs multiplexing for the data frames under the control of the controller 40.

Then, the communication module 20 performs transmission processing for the multiplexed data frames.

Then, directional beams from the antenna module 10 are transmitted to the wireless terminals STA1 to STA3 respectively. In this manner, the access point device AP SDM-transmits data frames to the wireless terminals STA1 to STA3.

Then, the access point device AP confirms receipt confirmation frames returned from the wireless terminals STA1 to STA3 when an SIFS has passed after transmission of the data frames.

When receipt confirmation frames are returned from the wireless terminals STA1 to STA3 respectively, that is, when SDM-transmission of data frames to the wireless terminals STA1 to STA3 ends in success, the access point device AP performs SDM-transmission of data frames to the wireless terminals STA1 to STA3 continuously without carrier sensing when an SIFS has passed after completion of reception of the receipt confirmation frames.

Each of the data frames which are continuously transmitted by the access point device AP when the SIFS has passed after completion of reception of the receipt confirmation frames may be a data frame transmitted to any one of the wireless terminals STA1 to STA3 or may be data transmitted to another wireless terminal.

Unless a TXOP period has passed after acquisition of the transmission authorization or unless all data frames stored in the transmission buffer have been transmitted completely, the access point device AP transmits data frames continuously when the SIFS has passed after completion of reception of the receipt confirmation frames.

When receipt confirmation frames are not returned from all or part of the wireless terminals STA1 to STA3, that is, when SDM-transmission of data frames to the wireless terminals STA1 to STA3 ends in failure, the access point device AP transmits new data frames to wireless terminals returning the receipt confirmation frames while re-transmitting data frames to wireless terminals not returning the receipt confirmation frames.

The access point device AP gives priority to re-transmission of data frames over transmission of new data frames. When, for example, the access point device AP receives receipt confirmation frames from only the wireless terminals STA2 and STA3 though the access point device AP has SDM-transmitted data frames to the wireless terminals STA1 to STA3, the access point device AP performs re-transmission of a data frame to the wireless terminal STA1 and transmission of new data frames to the wireless terminals STA2 and STA3, simultaneously and on one and the same frequency channel (by SDM).

Alternatively, when receipt confirmation frames are not returned from all or part of the wireless terminals STA1 to STA3, that is, when SDM-transmission of data frames to the wireless terminals STA1 to STA3 ends in failure, the access point device AP may re-transmit data frames to only wireless terminals not returning the receipt confirmation frames.

When, for example, the access point device AP receives a receipt confirmation frame from only the wireless terminal STA2 though the access point device AP has SDM-transmitted data frames to the wireless terminals STA1 to STA3, the access point device AP re-transmits data frames to the wireless terminals STA1 and STA3 simultaneously and on one and the same frequency channel (by SDM).

Figure 3:
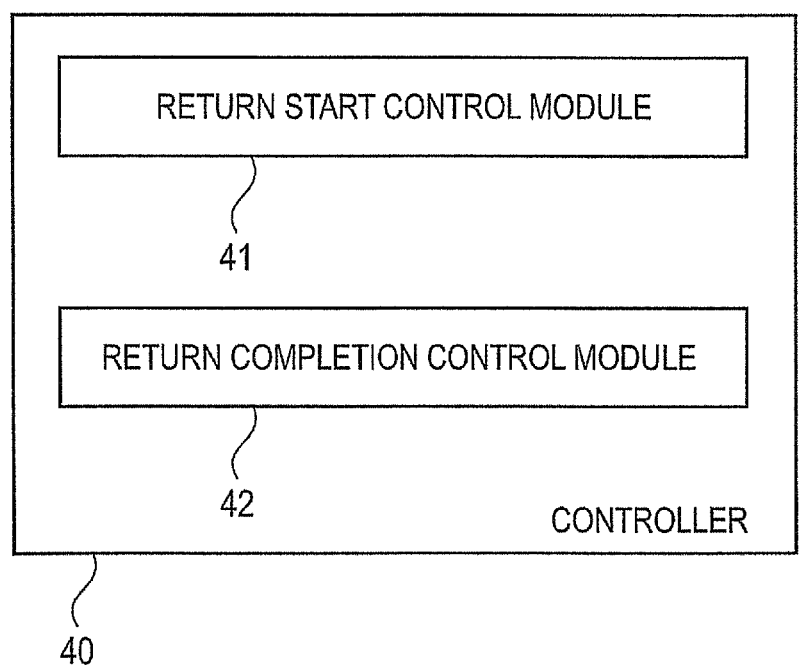
FIG. 3 is a block diagram showing the configuration of a controller according to the first embodiment of the invention.

FIG. 3 is a block diagram showing the configuration of the controller 40. An operation of the controller 40 when the access point device AP SDM-transmits data frames to the wireless terminals STA1 to STA3 will be described below in connection with the configuration of the controller 40.

The controller 40 has a return start control module 41, and a return completion control module 42.

The return start control module 41 controls SDM-transmitted data frames and a transmission method thereof when the data frames are SDM-transmitted to the wireless terminals STA1 to STA3 so that the wireless terminals STA1 to STA3 on the receiver side will start returning of receipt confirmation frames at synchronized timing (hereinafter referred to as return start timing).

Any method may be used as the control method performed by the return start control module 41 if the return start timings of the wireless terminals STA1 to STA3 on the receiver side of SDM-transmission can be synchronized with one another. The control method performed by the return start control module 41 will be described by way of example as follows.

First Example of Control Method

The return start control module 41 equalizes the frame time lengths of data frames to be SDM-transmitted to the wireless terminals STA1 to STA3.

For example, the return start control module 41 equalizes the frame lengths of data frames to be SDM-transmitted to the wireless terminals STA1 to STA3 and equalizes the transfer rates in SDM-transmission of data frames to the wireless terminals STA1 to STA3 to thereby equalize the frame time lengths of the data frames to be SDM-transmitted to the wireless terminals STA1 to STA3.

Alternatively, for example, the return start control module 41 equalizes the ratio of the frame length of a data frame SDM-transmitted to a wireless terminal to the transfer rate in SDM transmission of the data frame to the wireless terminal, among the wireless terminals STA1 to STA3 to thereby equalize the frame time lengths of the data frames to be SDM-transmitted to the wireless terminals STA1 to STA3.

That is, for example, the return start control module 41 can perform control in such a manner that the frame length of a data frame to be SDM-transmitted to the wireless terminal STA1 is set to be twice as large as the frame length of a data frame to be SDM-transmitted to the wireless terminal STA2 while the transfer rate in SDM-transmission to the wireless terminal STA1 is set to be twice as high as the transfer rate in SDM-transmission to the wireless terminal STA2.

In this manner, the return start control module 41 synchronizes data frames SDM-transmitted from the access point device AP to the wireless terminals STA1 to STA3 so that transmission of the data frames can be completed at synchronized timing (hereinafter referred to as transmission completion timing). Each of the wireless terminals STA1 to STA3 starts returning of a receipt confirmation frame when an SIFS has passed after the transmission completion timing. Accordingly, the return start timings of the wireless terminals STA1 to STA3 on the receiver side of SDM-transmission are synchronized with one another.

Second Example of Control Method

When the frame time lengths of data frames to be SDM-transmitted to the wireless terminals STA1 to STA3 are different, the return start control module 41 delays the timing of start of transmission (hereinafter referred to as transmission start timing) of any other data frame than a data frame largest in frame time length for a difference between the frame time lengths of the data frames so that the transmission completion timing of the data frame largest in frame time length can be synchronized with the transmission completion timing of any other data frame.

In this manner, like the first example, the transmission completion timings of data frames are synchronized with one another, so that the return start timings of receipt confirmation frames are synchronized with one another.

The aforementioned synchronization of the transmission completion timings of data frames and the return start timings of receipt confirmation frames need not mean complete synchronization so that the difference between the return start timings of receipt confirmation frames from a plurality of wireless terminals can be allowed to be not larger than the SIFS (16 microseconds).

However, for reception of receipt confirmation frames from three or more wireless terminals, it is necessary that the difference between the return completion timing of a receipt confirmation frame earliest in completion of reception thereof and the return completion timing of a receipt conformation frame latest in completion of reception thereof is not larger than the SIFS (16 microseconds).

Although description has been made on the case where the difference between the return start timings of receipt confirmation frames from a plurality of wireless terminals can be allowed to be not larger than the SIFS (16 microseconds), the difference may be set, for example, to be not larger than the time length of a preamble of each data frame.

The return completion control module 42 controls SDM-transmitted data frames and a transmission method thereof when data frames are SDM-transmitted to the wireless terminals STA1 to STA3 so that returning of receipt confirmation frames from the wireless terminals STA1 to STA3 on the receiver side can be completed at synchronized timing (hereinafter referred to as return completion timing).

Any method may be used as the control method performed by the return completion control module 42 if the return completion timings of receipt confirmation frames from the wireless terminals STA1 to STA3 on the receiver side of SDM-transmission can be synchronized with one another. The control method performed by the return completion control module 42 will be described later in detail.

As described above, in the access point device AP, the return start control module 41 synchronizes the return start timings of receipt confirmation frames returned from the wireless terminals STA1 to STA3 on the receiver side of SDM-transmission of data frames, and the return completion control module 42 synchronizes the return completion timings of the receipt confirmation frames returned from the wireless terminals STA1 to STA3 on the receiver side of SDM-transmission of the data frames.

In this manner, even when the access point device AP SDM-transmits data frames to the wireless terminals STA1 to STA3 so that the data frames can be transmitted continuously without carrier sensing in a TXOP period, the transmission of the data frames by the access point device AP can be prevented from overlapping with the reception of receipt confirmation frames by the access point device AP.

For this reason, even when the access point device AP SDM-transmits data frames to the wireless terminals STA1 to STA3, the data frames can be transmitted continuously based on the concept of TXOP in IEEE802.11e without carrier sensing when the SIFS has passed after reception of receipt confirmation frames. Accordingly, MAC efficiency can be improved.

The aforementioned synchronization of the return completion timings of receipt confirmation frames need not mean complete synchronization so that the difference between the return completion timings of receipt confirmation frames from a plurality of wireless terminals can be allowed to be not larger than the SIFS (16 microseconds).

However, for reception of receipt confirmation frames from three or more wireless terminals, it is necessary that the difference between the return completion timing of a receipt confirmation frame earliest in completion of reception thereof and the return completion timing of a receipt confirmation frame latest in completion of reception thereof is not larger than the SIFS (16 microseconds).

Although description has been made on the case where the difference between the return completion timings of receipt confirmation frames from a plurality of wireless terminals can be allowed to be not larger than the SIFS (16 microseconds), the difference may be set, for example, to be not larger than the time length of a preamble of each data frame.

The point of difference between the return start control module 41 and the return completion control module 42 will be described below.

The return start control module 41 synchronizes the transmission completion timings of data frames transmitted to a plurality of wireless terminals in order to synchronize the return start timings of receipt confirmation frames returned from the plurality of wireless terminals. That is, the return start control module 41 can control data frames transmitted by the access point device AP and a transmission method thereof without necessity of controlling the wireless terminals on the receiver side.

On the other hand, the return completion control module 42 needs to perform control in consideration of a return method of receipt confirmation frames returned from a plurality of wireless terminals on the receiver side in order to synchronize the return completion timings of the receipt confirmation frames returned from the plurality of wireless terminals.

Items concerned with the control of the return completion control module 42 will be described below.

First, in a wireless system compliant with the IEEE802.11 standard, the type of a receipt confirmation frame to be returned when an access point device or a wireless terminal receives a frame varies according to the type of the received frame.

When, for example, an RST (Request To Send) frame which is a kind of control frame is received, the access point device or the wireless terminal returns a CTS (Clear To Send) frame as the receipt confirmation frame.

When, for example, a data frame is received, the access point device or the wireless terminal returns an ACK frame or a Block ACK frame as the receipt confirmation frame or does not return any receipt confirmation frame in accordance with the Ack Policy field described in a MAC header of the data frame.

The Block ACK frame returned as the receipt confirmation frame in response to reception of a data frame can be classified into a plurality of types, that is, normal Block ACK frame, Compressed Block ACK frame (defined in IEEE802.11n) and Multi TID Block ACK frame (defined in IEEE802.11n).

For this reason, when the Ack Policy field of the data frame indicates Block Ack Policy, the access point device or the wireless terminal returns any one of a normal Block ACK frame, a Compressed Block ACK frame and a Multi TID Block ACK frame as the receipt confirmation frame.

As described above, the type of a receipt confirmation frame to be returned when an access point device or a wireless terminal receives a frame varies according to the type of the received frame.

The frame size of a receipt confirmation frame according to the type of the receipt confirmation frame will be described below.

In the IEEE802.11 standard, the frame size of a CTS frame or an ACK frame is 14 bytes long.

In the IEEE802.11n standard, the frame size of a normal Block ACK frame is 152 bytes long. In the IEEE802.11n standard, the frame size of a Compressed Block ACK frame is 32 bytes long. In the IEEE802.11n standard, the frame size of a Multi TID Block ACK frame is variable and (22+10n) bytes long when n is the number of traffic identifiers (TIDs) contained in the received data frame (n is an integer not smaller than 2).

As described above, the frame size of a receipt confirmation frame varies according to the type of the receipt confirmation frame.

When the access point device AP SDM-transmits different data frames (e.g. including control frames such as RST frames and Block Ack Request frames, and management frames) to a plurality of wireless terminals, the access point device AP receives receipt confirmation frames different in type and frame size from the plurality of wireless terminals.

Even when the return start timings of the receipt confirmation frames returned from the plurality of wireless terminals are synchronized with one another, the return completion timings of the receipt confirmation frames cannot be synchronized with one another in accordance with the synchronization of the return start timings because the receipt confirmation frames returned from the plurality of wireless terminals have different frame sizes.

Moreover, in a wireless system compliant with the IEEE802.11 standard, various values are prepared as the transfer rate in exchange (transmission/reception) of a frame between an access point device and a wireless terminal.

For this reason, even when the return start timings of receipt confirmation frames are synchronized with one another, the return completion timings of the receipt confirmation frames returned to the access point device AP from a plurality of wireless terminals cannot be synchronized with one another in accordance with the synchronization of the return start timings of the receipt confirmation frames because the receipt confirmation frames returned from the plurality of wireless terminals are different in transfer rate as well as different in frame size according to the type of each receipt confirmation frame.

FIGS. 4A and 4B are diagrams showing examples in which the return start timings of receipt confirmation frames returned from a plurality of wireless terminals are synchronized with one another but the return completion timings of the receipt confirmation frames are not synchronized with one another.

FIG. 4A shows the case where the transfer rates of receipt confirmation frames returned from the wireless terminals STA1 and STA2 are equally 24 Mbps but the receipt confirmation frames returned from the wireless terminals STA1 and STA2 are an Ack frame (14 bytes long) and a Block Ack frame (152 bytes long), respectively.

FIG. 4B shows the case where receipt confirmation frames returned from the wireless terminals STA1 and STA2 are equally of an ACK frame type but the transfer rates of the receipt confirmation frames returned from the wireless terminals STA1 and STA2 are 24 Mbps and 6 Mbps, respectively.

Because receipt confirmation frames returned from a plurality of wireless terminals (wireless terminals STA1 and STA2 in the examples shown in FIGS. 4A and 4B are different in frame size in accordance with the type of each receipt confirmation frame and different in transfer rate in this manner, the return completion timings of the receipt confirmation frames returned from the plurality of wireless terminals cannot be synchronized even when the return start timings thereof are synchronized.

For this reason, even when the return start timings of receipt confirmation frames are synchronized, there is a possibility that transmission of data frames by the access point device AP and reception of the receipt confirmation frames by the access point device AP will overlap with each other to cause collision if data frames are SDM-transmitted to a plurality of wireless terminals so that the data frames can be transmitted continuously without carrier sensing in the TXOP period.

That is, it is important to synchronize the return completion timings of the receipt confirmation frames returned from the plurality of ratio terminals in order to make it possible that the access point device AP SDM-transmits data frames to the plurality of wireless terminals so that the data frames can be transmitted continuously without carrier sensing in the TXOP period.

The return completion control module 42 controls each of data frames SDM-transmitted to the plurality of wireless terminals and a transmission method thereof to thereby control each of receipt confirmation frames returned from the wireless terminals on the receiver side and a return method thereof without awareness of the wireless terminals on the receiver side. That is, the return completion control module 42 controls each of data frames SDM-transmitted to the plurality of wireless terminals and a transmission method thereof to thereby synchronize the reception completion timings of receipt confirmation frames returned from the wireless terminals on the receiver side.

Figure 5:
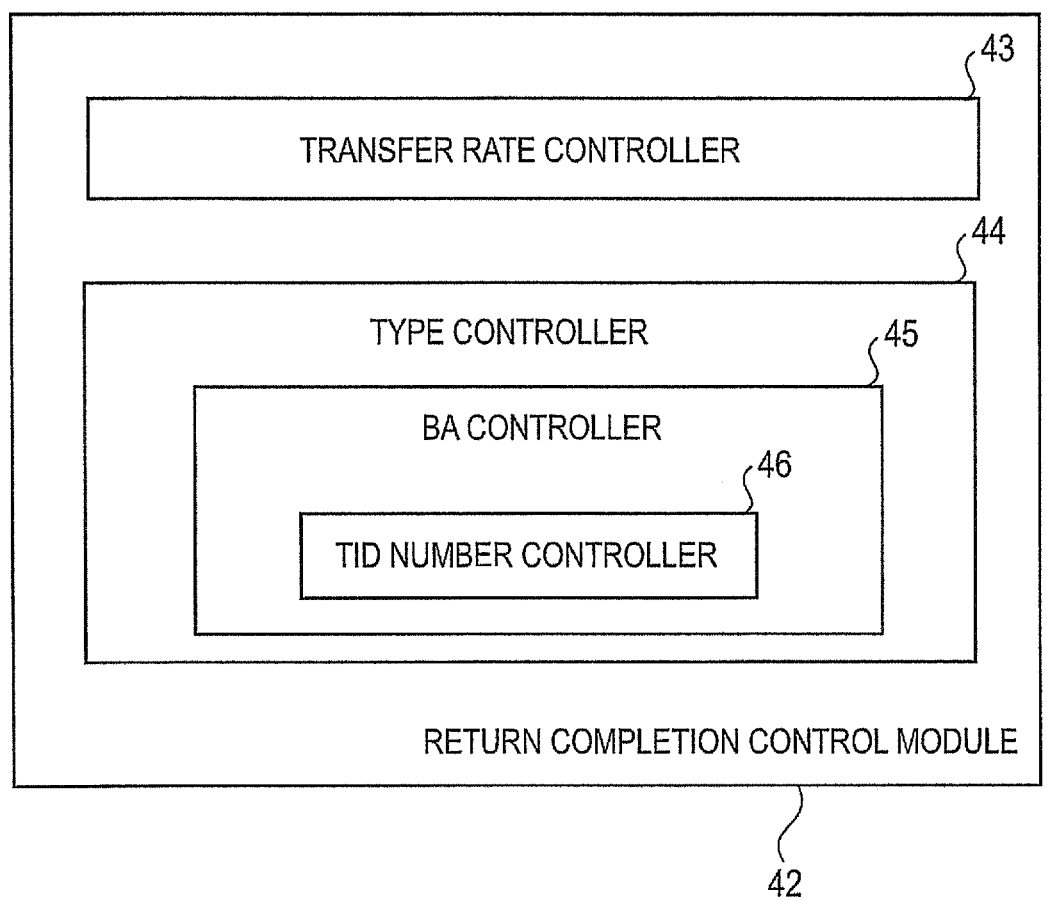
FIG. 5 is a block diagram showing the configuration of a return completion control module according to the first embodiment of the invention.

FIG. 5 is a block diagram showing the configuration of the return completion control module 42.

The return completion control module 42 has a transfer rate controller 43, and a type controller 44. The type controller 44 has a BA controller 45. The BA controller 45 has a TID number controller 46.

For synchronization of the reception completion timings of receipt confirmation frames returned from the wireless terminals on the receiver side, the transfer rate controller 43 of the return completion control module 42 first determines the transfer rate used for SDM-transmission of data frames to a plurality of wireless terminals. After determination of the transfer rate, the transfer rate controller 43 of the return completion control module 42 notifies the return start control module 41 of the determined transfer rate because the transfer rate has influence on the time length of each data frame and is used for the return start control of receipt confirmation frames.

The transfer rate controller 43 controls the transfer rate for returning receipt confirmation frames from the plurality of wireless terminals by determining the transfer rate used for SDM-transmission of data frames to the plurality of wireless terminals.

In a wireless system compliant with the IEEE802.11 standard, the transfer rate for returning a receipt confirmation frame is determined as the highest one of transfer rates defined in a Basic Rate Set and not higher than the transfer rate of the received data frame.

For example, assume that the Basic Rate Set is defined as {6 Mbps, 12 Mbps, 24 Mbps} in the wireless system.

Example 1

When the wireless terminal STA1 receives a data frame from the access point device AP at a transfer rate of 54 Mbps, the wireless terminal STA1 returns a receipt confirmation frame at a transfer rate of 24 Mbps.

Example 2

When the wireless terminal STA1 receives a data frame from the access point device AP at a transfer rate of 18 Mbps, the wireless terminal STA1 returns a receipt confirmation frame at a transfer rate of 12 Mbps.

The transfer rate controller 43 determines transfer rates for SDM-transmission of data frames to a plurality of wireless terminals by using the transfer rate determining mechanism at the time of returning receipt confirmation frames in a wireless system compliant with the IEEE802.11 standard so that the transfer rates of the receipt configuration frames returned from the respective wireless terminals are equalized as one and the same transfer rate.

The transfer rate controller 43 determines transfer rates not lower than the highest one of transfer rates defined in the Basic Rate Set as the transfer rates for SDM-transmission of data frames to the plurality of wireless terminals.

The transfer rate controller 43 sets one of transfer rates defined in the Basic Rate Set except the highest one of the defined transfer rates as a first transfer rate, sets the lowest one of transfer rates defined in the Basic Rate Set and higher than the first transfer rate as a second transfer rate, and determines transfer rates not lower than the first transfer rate and lower than the second transfer rate as the transfer rates for SDM-transmission of data frames to the plurality of wireless terminals. The transfer rate for returning receipt confirmation frames to the access point device AP from the plurality of wireless terminals on the receiver side is equal to the first transfer rate.

When, for example, the Basic Rate Set is {6 Mbps, 12 Mbps, 24 Mbps} and a receipt conformation frame is intended to be returned from each wireless terminal to the access point device AP at a transfer rate of 24 Mbps, the transfer rate controller 43 determines the transfer rate for each of data frames to be SDM-transmitted to the wireless terminals from any one of 24 Mbps, 36 Mbps, 48 Mbps and 54 Mbps.

When the access point device AP transmits data frames to the wireless terminals at the aforementioned transfer rates (each of which is any one of 24 Mbps, 36 Mbps, 48 Mbps and 54 Mbps), the respective wireless terminals on the receiver side return receipt confirmation frames at a transfer rate of 24 Mbps.

Accordingly, even when data frames are intended to be SD-transmitted to wireless terminals so that the wireless terminals on the receiver side can return receipt confirmation frames at one and the same transfer rate, the transfer rate controller 43 need not equalize the transfer rates for SDM-transmission of data frames to the wireless terminals as one and the same transfer rate and can select and determine the transfer rates independently from the aforementioned four kinds of transfer rates (24 Mbps, 36 Mbps, 48 Mbps and 54 Mbps).

Further, when, for example, the Basic Rate Set is {6 Mbps, 12 Mbps, 24 Mbps} and a receipt conformation frame is intended to be returned from each wireless terminal to the access point device AP at a transfer rate of 6 Mbps, the transfer rate controller 43 selects and determines the transfer rate for each of data frames to be SDM-transmitted to the wireless terminals from either of 6 Mbps and 9 Mbps.

In this manner, the transfer rate controller 43 of the return completion control module 42 controls the transfer rates for data frames to be SDM-transmitted from the access point device AP to the wireless terminals to thereby control the transfer rate for receipt confirmation frames so that the wireless terminals on the receiver side can return the receipt confirmation frames at one and the same transfer rate without awareness of the wireless terminals on the receiver side.

For synchronization of the reception completion timings of receipt confirmation frames returned from the wireless terminals on the receiver side, the type controller 44 of the return completion control module 42 determines the types of data frames to be SDM-transmitted to the wireless terminals after the transfer rate controller 43 of the return completion control module 42 determines the transfer rates.

The type controller 44 determines the types of data frames (including Block Ack Request control frames) to be SDM-transmitted to the wireless terminals to thereby control the types of receipt confirmation frames to be returned from the wireless terminals on the receiver side.

The type controller 44 controls the types of receipt confirmation frames to be returned from the wireless terminals on the receiver side so that the types of receipt confirmation frames can be equalized as one and the same type, that is, the frame sizes of the receipt confirmation frames can be equalized as one and the same frame size. The control method performed by the type controller 44 will be described below.

First, the type controller 44 determines "Ack Policy" fields (hereinafter referred to as respective "Ack Policy" fields) of MAC headers of data frames to be SDM-transmitted to the wireless terminals.

The type controller 44 determines any one of "Normal Ack", "Block Ack" and "No Ack" as a unified ACK policy for the respective "Ack Policy" fields. Data frames whose respective "Ack Policy" fields can be unified by the type controller 44 may be selected as the data frames to be SDM-transmitted to the wireless terminals, in advance.

Any method may be used in the type controller 44 as to which of "Normal Ack", "Block Ack" and "No Ack" is determined as a unified ACK policy for the respective Ack Policy fields.

For example, the type controller 44 determines a unified ACK policy for the respective "Ack Policy" fields in accordance with the traffic types of respective data frames to be transmitted, the combination of respective wireless terminals on the receiver side and respective data frames to be SDM-transmitted, the quantity of data stored in the transmission buffer of the MAC processing module 30, etc.

In this manner, upon reception of data frames from the access point device AP, the wireless terminals return receipt confirmation frames respectively in accordance with the unified ACK policy set in the "Ack Policy" fields of the received data frames.

When "Normal Ack" is set in the "Ack Policy" field of a data frame, the wireless terminal returns an ACK frame as the receipt confirmation frame after reception of the data frame from the access point device AP.

When "Block Ack" is set in the "Ack Policy" field of a data frame, the wireless terminal returns a Block ACK frame as the receipt confirmation frame after reception of a Block Ack Request frame following the data frame from the access point device AP.

When "Block Ack" is set in the "Ack Policy" field of a data frame and the data frame is A-MPDU (Aggregated-MPDU), the wireless terminal returns a Block ACK frame as the receipt confirmation frame after reception of the data frame (A-MPDU) from the access point device AP.

When "No Ack" is set in the "Ack Policy" field of a data frame, the wireless terminal does not return any receipt confirmation frame.

As described above, the type controller 44 determines "Block Ack" as a unified ACK policy for the respective "Ack Policy" fields, each wireless terminal on the receiver side returns a Block ACK frame as the receipt confirmation frame but the type of the Block ACK frame varies.

Therefore, when the type controller 44 determines "Block Ack" as a unified ACK policy for the respective "Ack Policy" fields, the BA controller 45 further performs control to equalize the types of Block ACK frames to be returned from the wireless terminals.

The BA controller 45 performs control to determine any one of a normal Block ACK frame, a Compressed Block ACK frame and a Multi TID Block ACK frame as a unified type for Block ACK frames to be returned from the wireless terminals receiving data frames from the access point device AP.

According to the IEEE802.11n standard, when the access point device AP SDM-transmits data frames (A-MPDU) to the wireless terminals respectively, receipt confirmation frames returned from the wireless terminals respectively are always Compressed Block ACK frames. That is, when the BA controller 45 performs control so that data frames to be SDM-transmitted to the wireless terminals respectively are transmitted as A-MPDU frames, receipt confirmation frames to be returned from the wireless terminals respectively can be controlled to be Compressed Block ACK frames.

When the data frame is not A-MPDU, each wireless terminal returns a receipt confirmation frame to the access point device AP basically after reception of a Block Ack Request frame. Therefore, the BA controller 45 of the access point device AP controls the type of a Block ACK frame to be returned in the category of the IEEE802.11 standard by using the MAC header of a Block Ack Request frame when the Block Ack Request frame is transmitted to each wireless terminal.

The type of the Block ACK frame to be returned can be designated by the MAC header of the Block Ack Request frame.

Figure 6A:
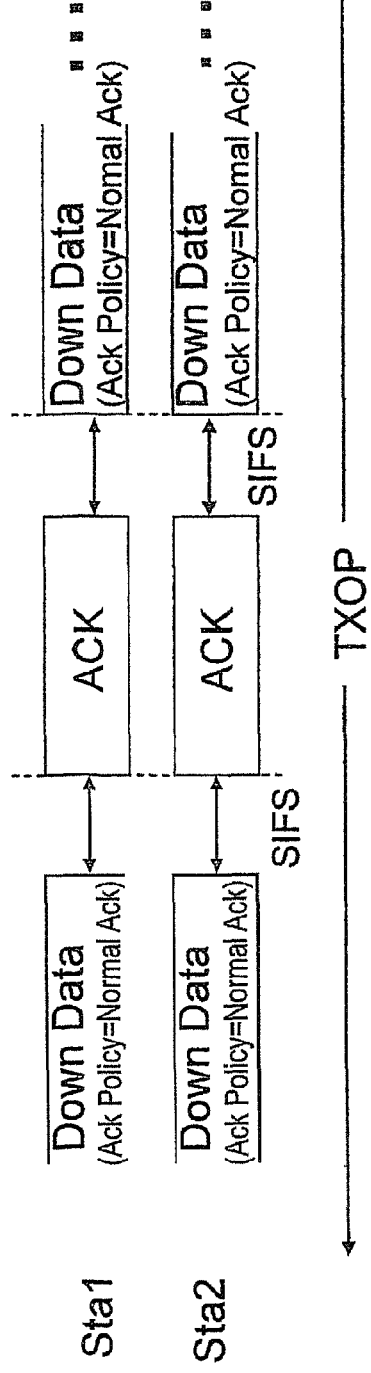
FIGS. 6A and 6B are views frames exchanged between the access point device and the plurality of wireless terminals.
Figure 6B:
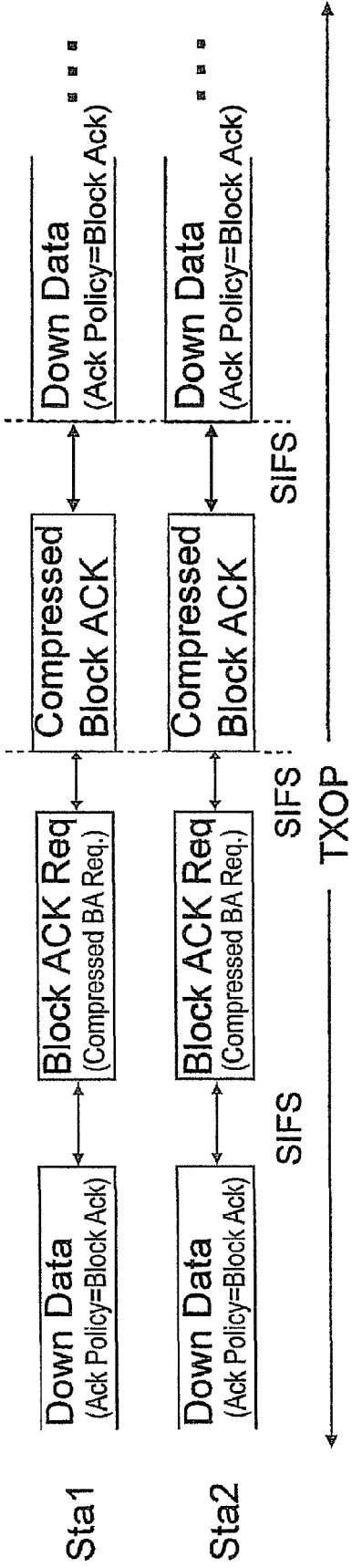

FIGS. 6A and 6B are diagrams showing frames transmitted/received by the wireless terminals STA1 and STA2 when the Ack Policy fields are unified.

FIG. 6A is a diagram showing transmission/reception of frames when the access point device AP SDM-transmits data frames (Down Data) each having an "Ack Policy" field of "Normal Ack" to the wireless terminals STA1 and STA2 and the types of receipt confirmation frames returned from the wireless terminals STA1 and STA2 are unified into an ACK frame.

Each of the wireless terminals STA1 and STA2 returns an ACK frame as the receipt confirmation frame when the SIFS has passed after reception of the data frame (Down Data) from the access point device AP.

FIG. 6B is a diagram showing transmission/reception of frames when the access point device AP SDM-transmits data frames (Down Data) each having an "Ack Policy" field of "Block Ack" and successively transmits Block Ack Requests to the wireless terminals STA1 and STA2 and the types of receipt confirmation frames returned from the wireless terminals STA1 and STA2 are unified into a Compressed Block Ack frame.

Each of the wireless terminals STA1 and STA2 returns a Compressed Block Ack frame as the receipt confirmation frame when the SIFS has passed after reception of the Block Ack Request from the access point device AP.

Any method may be used as the control method performed by the BA controller 45 if the types of Block Ack frames returned from a plurality of wireless terminals can be equalized.

A Compressed Block ACK frame and a Multi TID Block frame are frames newly defined in the IEEE802.11n standard. For this reason, when any wireless terminal not compliant with the IEEE802.11n standard is contained in the wireless terminals on the receiver side of SDM-transmission of data frames from the access point device AP, the BA controller 45 unifies the types of the Block Ack frames returned from the wireless terminals, into a normal Block ACK frame.

The Compressed Block ACK frame is a receipt confirmation frame corresponding to a data frame not based on such fragmentation that the data frame is fragmented into parts. For this reason, when the BA controller 45 performs control so that the types of Block ACK frames to be returned from the wireless terminals are unified into a Compressed Block ACK frame, each of data frames to be SDM-transmitted from the access point device AP to the wireless terminals is not fragmented into parts.

Description will be made on the case where the BA controller 45 unifies the types of receipt confirmation frames to be returned from the wireless terminals into a Multi TID Block Ack frame when the access point device AP SDM-transmits data frames each having an "Ack Policy" field of "Block Ack" to the wireless terminals.

When the BA controller 45 unifies the types of receipt confirmation frames to be returned from the wireless terminals into a Multi TID Block Ack frame, the TID number controller 46 further performs control to equalize the numbers of TIDs in Multi TID Block Ack frames to be returned from the wireless terminals respectively.

Control of the number of TIDs can be designated in the same manner as the type of a Block ACK frame by controlling each of data frames to be SDM-transmitted in the category of the IEEE802.11 wireless LAN standard such as Block Ack Request.

As described above, when the access point device AP SDM-transmits data frames to the wireless terminals, not only the transmission completion timings of the data frames to the wireless terminals can be synchronized but also the return completion timings of receipt confirmation frames from the wireless terminals can be synchronized without any special process request on the respective wireless terminals, but by controlling the type of each of the data frames to be transmitted to the wireless terminals, the transfer rate for transmission of each data frame, the "Ack Policy" field of the MAC header of each data frame, the type of each Block Ack frame requested by Block Ack Request, the number of TIDs in each Multi TID Block ACK frame, etc.

In this manner, in the wireless system according to the first embodiment, when the access point device AP SDM-transmits data frames to the wireless terminals, the reception completion timings of receipt confirmation frames returned from the wireless terminals can be synchronized. Accordingly, even when the access point device AP performs continuous transmission of data frames by using the concept of TXOP defined in the IEEE802.11e standard while transmitting data frames to the wireless terminals simultaneously on one and the same frequency channel by SDM, collision can be prevented from being caused by overlap between the transmission timings of data frames by the access point device AP and the reception timings of receipt confirmation frames by the access point device AP. Accordingly, the access point device AP according to the first embodiment can transmit data frames continuously without carrier sensing by using the concept of TXOP while SDM-transmitting data frames to the wireless terminals, so that improvement of MAC efficiency can be achieved.

In the wireless system according to the first embodiment, though the access point device AP transmits data frames simultaneously and on one and the same frequency channel, the reception completion timings of receipt confirmation frames returned from the wireless terminals can be synchronized by a simple method in which each wireless terminal transmits a receipt confirmation frame when the SIFS has passed after reception of a corresponding one of the data frames SDM-transmitted from the access point device AP, in accordance with the IEEE802.11 (including IEEE802.11e and IEEE802.11n) standard.

In the wireless system according to the first embodiment, when the access point device AP SDM-transmits data frames to the wireless terminals, each of the data frames and a transmission method thereof are controlled but each wireless terminal need not be notified of any special information. Accordingly, it is unnecessary to add any new processing module to each wireless terminal.

In the wireless system according to the first embodiment, the access point device AP performs control by using the IEEE802.11 standard effectively and transmits data frames to the wireless terminals in accordance with the control. Accordingly, each wireless terminal can return a desired receipt confirmation frame without any awareness, so that the reception completion timings of the receipt confirmation frames returned from the wireless terminals can be synchronized.

The first embodiment has been described on the assumption that SDM is used when the access point device AP transmits (multiplexes and transmits) data frames to the plurality of wireless terminals simultaneously, and that data frames are transmitted simultaneously and on one and the same frequency channel.

However, in the first embodiment, another multiplexing method such as FDM (Frequency Division Multiplexing) or CDM (Code Division Multiplexing) than SDM may be used when the access point device AP multiplexes and transmits data frames to the plurality of wireless terminals.

In this manner, the access point device AP can transmit data frames continuously based on the concept of TXOP without carrier sensing while the access point device AP multiplexes and transmits data frames to the plurality of wireless terminals, so that improvement of MAC efficiency can be achieved.

The access point device AP can be achieved, for example, by a general-purpose computer used as basic hardware. That is, the MAC processing module 30, the controller 40 (including the return start control module 41, the return completion control module 42, the transfer rate controller 43, the type controller 44, the BA controller 45, and the TID number controller 46) and the multiplexing module 50 can be achieved by a program executed by a processor mounted in the computer. The access point device AP may be achieved by the program installed in the computer in advance or by the program stored in a recording medium such as a CD-ROM or distributed through a network and suitably installed in the computer. The transmission buffer (not shown) of the MAC processing module 30 can be achieved by suitable use of a built-in or external memory of the computer, a hard disk or a recording medium such as a CD-R, a CD-RW, a DVD-RAM or a DVD-R.

Second Embodiment

In the wireless system according to the first embodiment, when the access point device AP SDM-transmits data frames to the plurality of wireless terminals, the access point device AP controls each data frame and a transmission method thereof so that the reception completion timings of receipt confirmation frames returned from the wireless terminals can be synchronized with one another without the wireless terminals' awareness.

In a wireless system according to a second embodiment, the access point device AP designates a returning method of each receipt confirmation frame explicitly to the plurality of wireless terminals so that the reception completiontimings of receipt confirmation frames returned from the wireless terminals can be synchronized with one another.

In the wireless system according to the second embodiment, because the returning method of each receipt confirmation frame is designated explicitly, the access point device AP can determine each data frame and a transmission method thereof freely without any restriction when the access point device AP SDM-transmits data frames to the plurality of wireless terminals.

Figure 7:
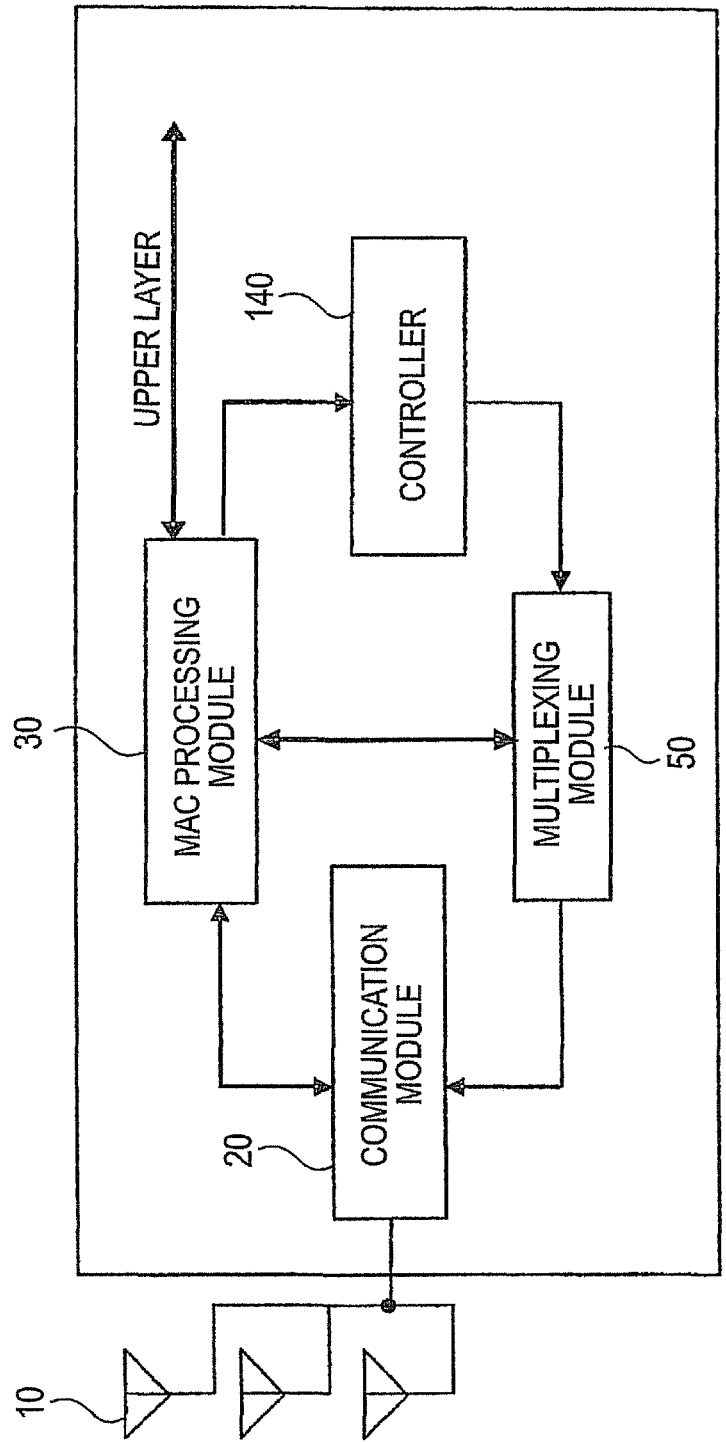
FIG. 7 is a block diagram showing an example of configuration of the access point device according to a second embodiment of the invention.

FIG. 7 is a block diagram showing an example of configuration of the access point device AP according to the second embodiment.

The configuration of the access point device AP according to the second embodiment is different from that of the access point device AP according to the first embodiment in the operation of the controller 140. The controller 140 according to the second embodiment has the same function as the return start control module 41 according to the first embodiment.

When or before the access point device AP SDM-transmits data frames to a plurality of wireless terminals, the controller 140 determines a returning method of a receipt confirmation frame from each wireless terminal so that the return completion timings of receipt confirmation frames returned from the plurality of wireless terminals can be synchronized with one another. The controller 140 determines the receipt confirmation frame returning method such as a transfer rate, an Ack Policy, etc. in accordance with each of data frames to be SDM-transmitted by the access point device AP.

The access point device AP notifies each wireless terminal of the receipt confirmation frame returning method determined by the controller 140 so that the return completion timings of receipt confirmation frames returned from the wireless terminals can be synchronized with one another.

The access point device AP may notify each wireless terminal of the receipt confirmation frame returning method when the access point device AP SDM-transmits data frames to the plurality of wireless terminals. Alternatively, the access point device AP may notify each wireless terminal of the receipt confirmation frame returning method (at the time of Association, etc.) before the access point device AP SDM-transmits data frames to the plurality of wireless terminals. Alternatively, the access point device AP may notify each wireless terminal of the receipt confirmation frame returning method periodically.

In the wireless system according to the second embodiment, the access point device AP notifies each wireless terminal of the receipt confirmation frame returning method explicitly when the access point device AP SDM-transmits data frames to a plurality of wireless terminals. Each wireless terminal returns a receipt confirmation frame in accordance with the returning method given from the access point device AP. The access point device AP and each wireless terminal operate in this manner to synchronize the reception completion timings of receipt confirmation frames with one another.

Three examples of a method by which the access point device AP notifies each wireless terminal of the "receipt confirmation frame returning method" explicitly will be described below.

In a first notification method, the access point device AP writes the "receipt confirmation frame returning method" in the MAC header field of each of data frames to be transmitted and then SDM-transmits the data frames whenever the access point device AP SDM-transmits data frames to a plurality of wireless terminals. The field of the MAC header of each data frame in which the "receipt conformation frame returning method" is written is not defined in the current IEEE802.11 standard. The field will be defined in a standard designed in the future.

In a second notification method, the access point device AP sends notice of the "receipt confirmation frame returning method" to wireless terminals connected to one and the same network at the time of starting the network or during establishment of the network. The access point device AP writes the "receipt confirmation frame returning method" in a Broadcast frame (a report frame such as a Beacon frame or a Probe Response frame) and transmits the Broadcast frame to all the wireless terminals connected to one and the same network.

In a third notification method, the access point device AP sends advance notice of the "receipt confirmation frame returning method" to wireless terminals connected to one and the same network at the time of starting the network or during establishment of the network by using a Multicast frame in accordance with each group of wireless terminals.

As described in the second notification method, when advance notice of the "receipt confirmation frame returning method" is sent by use of a Broadcast frame, the access point device AP can designate one and the same "receipt confirmation frame returning method" to all the wireless terminals connected to the network.

As described in the third notification method, when advance notice of the "receipt confirmation frame returning method" is sent by use of a Multicast frame, the access point device AP can designate a "receipt confirmation frame returning method" in accordance with each group of wireless terminals (hereinafter referred to as SDM-grouping) to which data frames can be transmitted at once.

The third notification method (advance notice using a Multicast frame) can perform ad hoc control because the access point device AP can designate the receipt confirmation frame returning method in accordance with SDM-grouping. In the third notification method, the access point device AP needs to send notice of the "receipt confirmation frame returning method" whenever SDM-grouping is changed.

The configuration of the access point device AP shown in FIG. 7 is an example of configuration in the case where the access point device AP sends notice of the "receipt confirmation frame returning method" to each wireless terminal by the first notification method (the second or third notification method may be further used).

Figure 8:
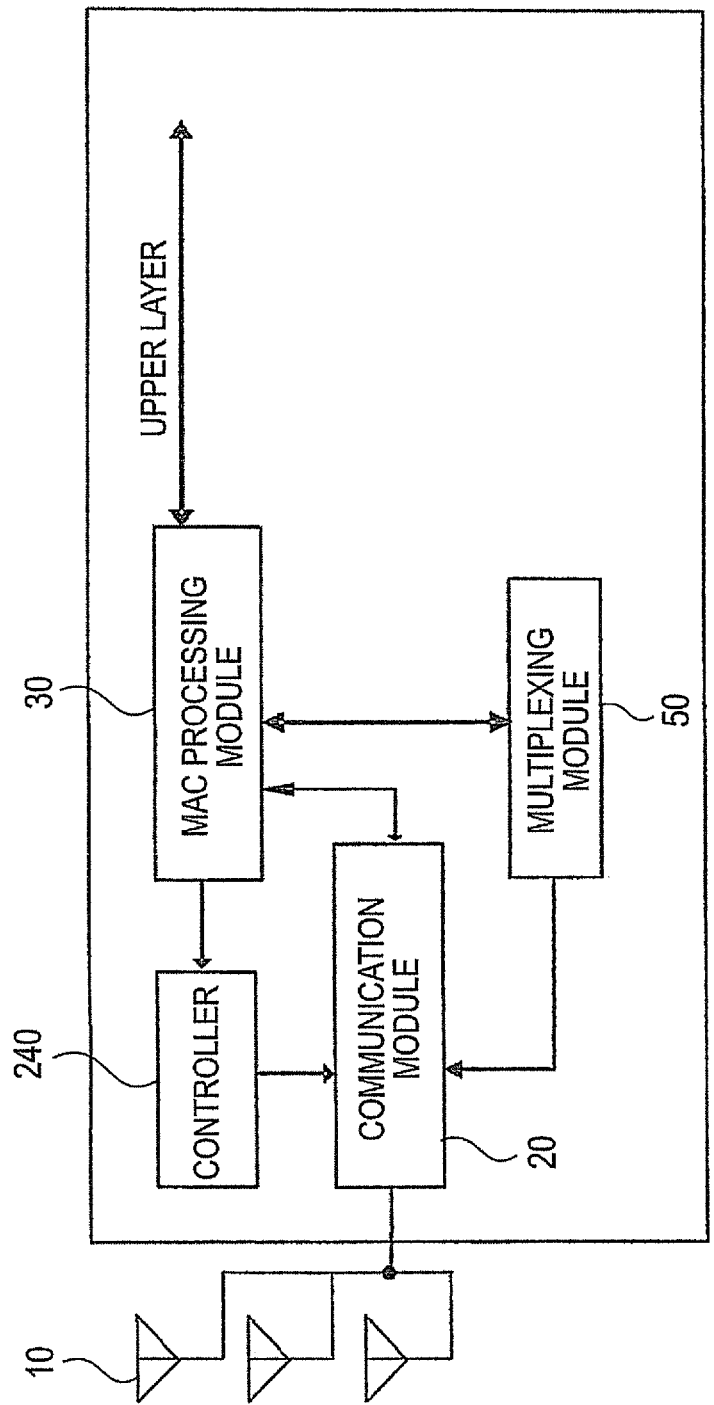
FIG. 8 is a block diagram showing another example of configuration of the access point device according to a second embodiment of the invention.
Figure 9:
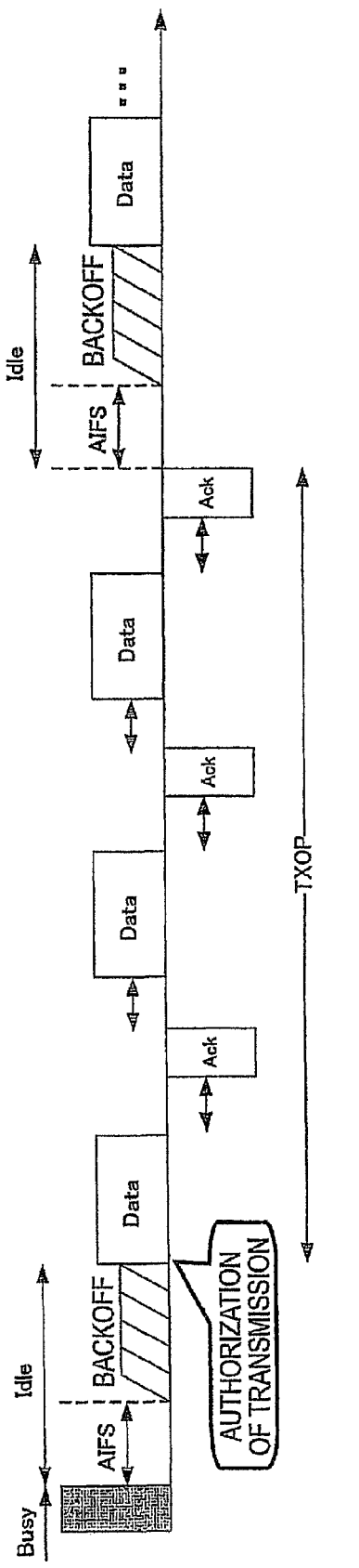
FIG. 9 is a view showing the concept of TXOP in the IEEE802.11e standard.

In the configuration of the access point device AP in the case where the access point device AP sends notice of the "receipt confirmation frame returning method" to each wireless terminal not by the first notification method but by the second or third notification method, it is unnecessary to connect the controller 140 to the multiplexing module 50 directly. For example, the access point device AP may be configured as shown in FIG. 8.

The operation of the controller 140 will be described below in the case where the access point device AP sends notice of the "receipt confirmation frame returning method" to each wireless terminal so that the return completion timings of receipt confirmation frames returned from the wireless terminals can be synchronized with one another.

The controller 140 determines the type of each receipt confirmation frame and the transfer rate in returning of the receipt confirmation frame. The type of each receipt confirmation frame and the transfer rate in returning of the receipt confirmation frame have been described in the first embodiment.

For example, in the first notification method, the controller 140 writes {receipt confirmation frame=ACK frame, transfer rate of receipt confirmation frame=24 Mbps} in the MAC header field of each of data frames to be SDM-transmitted to a plurality of wireless terminals by the access point device AP.

For example, in the second or third notification method, the controller 140 writes {receipt confirmation frame=Block ACK frame, transfer rate of receipt confirmation frame=9 Mbps} in a Broadcast frame or a Multicast frame to be transmitted by the access point device AP.

In this manner, the controller 140 sends of notice of the type of a receipt confirmation frame returned from each wireless terminal and the transfer rate in returning of the receipt confirmation frame, explicitly in accordance with each wireless terminal or in accordance with each SDM-grouping or in accordance with each network and performs control. As a result, when the access point device AP SDM-transmits data frames to the wireless terminals respectively, the type of each data frame and the transfer rate in transmission of the data frame can be selected and set independently.

In this manner, in the wireless system according to the second embodiment, the access point device AP sends notice of the receipt conformation frame returning method to each wireless terminal explicitly. As a result, when the access point device AP SDM-transmits data frames to a plurality of wireless terminals, the reception completion timings of receipt confirmation frames returned from the plurality of wireless terminals can be synchronized with one another.

For this reason, even when the access point device AP transmits data frames continuously based on the concept of TXOP defined in the IEEE802.11e standard while transmitting data frames to a plurality of wireless terminals simultaneously and on one and the same frequency channel by SDM, collision can be prevented from being caused by overlap between the transmission timings of data frames by the access point device AP and the reception timings of receipt confirmation frames by the access point device AP.

Accordingly, the access point device AP according to the second embodiment can transmit data frames continuously based on the concept of TXOP without carrier sensing while SDM-transmitting data frames to a plurality of wireless terminals, so that improvement of MAC efficiency can be achieved.

In the IEEE802.11n standard, each access point device AP and each wireless terminal are allowed to add a 32-byte field called "HT Control field" to a frame regardless of the type of the frame (inclusive of a receipt confirmation frame).

That is, in the IEEE802.11n standard, each wireless terminal is allowed to determine arbitrarily whether or not the HT Control field is to be added to a receipt confirmation frame to be returned to the access point device AP.

For this reason, even when the access point device AP designates the type of a receipt confirmation frame to be returned from each wireless terminal and the transfer rate in returning of the receipt confirmation frame, there is a possibility that the return completion timings of receipt confirmation frames returned from the wireless terminals will not be synchronized with one another.

Therefore, the controller 140 of the access point device AP according to the second embodiment may send notice of forbidden addition of the HT Control field or always addition of the HT Control field to a receipt confirmation frame in addition to the type of the receipt confirmation frame and the transfer rate in returning of the receipt confirmation frame when the network is compliant with the IEEE802.11n standard.

In this manner, even when the wireless system is compliant with the IEEE802.11n standard and each wireless terminal is allowed to add the HT Control field to a receipt confirmation frame arbitrarily, it is possible to synchronize the return completion timings of receipt confirmation frames returned from the wireless terminals to the access point device AP.

The controller 140 according to the second embodiment has the same function as the return start control module 41 according to the first embodiment.

However, the controller 140 according to the second embodiment may send notice of the return start timing of a receipt confirmation frame explicitly to each wireless terminal in place of the same function as the return start control module 41 according to the first embodiment in addition to notice of the type of the receipt confirmation frame to be returned from each wireless terminal, the transfer rate in returning of the receipt confirmation frame and information as to whether not only the HT Control field is to be added.

Further, the controller 140 according to the second embodiment sends notice of the type of the receipt confirmation frame to be returned from each wireless terminal, the transfer rate in returning of the receipt confirmation frame and information as to whether not only the HT Control field is to be added, explicitly to each wireless terminal, so that the return completion timings of receipt confirmation frames from the wireless terminals can be synchronized with one another.

However, the controller 140 according to the second embodiment may send notice of the return completion timing of a receipt confirmation frame explicitly to each wireless terminal in place of explicit notice of the aforementioned information.

Each wireless terminal explicitly notified of the return completion timing of the receipt confirmation frame performs control so that the return completion timing of the receipt completion frame actually returned from the wireless terminal is equalized to the return completion timing of the receipt confirmation frame given from the access point device AP.

In this manner, even when the access point device AP SDM-transmits data frames to a plurality of wireless terminals, it is possible to synchronize the return completion timings of receipt confirmation frames returned from the wireless terminals with one another.

If the return completion timing of the receipt confirmation frame returned from each wireless terminal can be synchronized with the return completion timing of the receipt confirmation frame given from the access point device AP, each wireless terminal may return any type of receipt confirmation frame and may return the receipt confirmation frame by any returning method (such as the transfer rate and the return start timing of the receipt confirmation frame).

The wireless system according to the second embodiment may use another multiplexing method such as FDM (Frequency Division Multiplexing) or CDM (Code Division Multiplexing) than SDM when the access point device AP multiplexes and transmits data frames to a plurality of wireless terminals, in the same manner as the wireless system according to the first embodiment.

It is to be understood that the present invention is not limited to the specific embodiments described above and that the present invention can be embodied with the components modified without departing from the spirit and scope of the present invention. The present invention can be embodied in various forms according to appropriate combinations of the components disclosed in the embodiments described above. For example, some components may be deleted from the configurations described as the embodiments. Further, the components described in different embodiments may be used appropriately in combination.

What is claimed is:

1. A wireless communication apparatus comprising:
   a transmitter configured to, by multiplexing, transmit a first frame to a first wireless apparatus and a second frame to a second wireless apparatus; and
   a receiver configured to receive a third frame from the first wireless apparatus and a fourth frame from the second wireless apparatus,
   wherein a length of the third frame is varied based on at least first content of the first frame,
   a length of the fourth frame is varied based on at least second content of the second frame,
   a temporal difference between a first receipt completion time at which the third frame is fully received by the receiver and a second receipt completion time at which the fourth frame is fully received by the receiver is less than a predetermined time length.

2. The apparatus of claim 1,
   wherein at least one of the first content of the first frame or the second content of the second frame is controlled such that the temporal difference is less than the predetermined time length.

3. The apparatus of claim 1,
   wherein the first content of the first frame is information for setting transmission rate of the third frame and the second content of the second frame is transmission rate of the fourth frame.

4. The apparatus of claim 1,
   wherein the first content of the first frame is information for setting a frame type of the third frame and the second content of the second frame is information for setting a frame type of the fourth frame.

5. The apparatus of claim 4,
   wherein the frame type of the third frame is an Ack policy for the third frame and the frame type of the fourth frame is an Ack policy for the fourth frame.

6. The apparatus of claim 1,
   wherein the first content of the first frame is information for setting a number of TID of the third frame and the second content of the second frame is information for setting a number of TID of the fourth frame.

7. The apparatus of claim 1,
   wherein the first content of the first frame is information included in a header of the first frame and the second content of the second frame is information included in a header of the second frame.

8. The apparatus of claim 1,
   wherein the length of the third frame and the length of the fourth frame are varied based on a combination of the first wireless apparatus and the second wireless apparatus.

9. The apparatus of claim 1, further comprising:
   at least one antenna for transmitting a radio wave.

10. The apparatus of claim 1,
    wherein the temporal difference is zero.

11. A wireless communication apparatus comprising:
    a transmitter configured to, with multiplexing, transmit a first frame to a first wireless apparatus and a second frame to a second wireless apparatus; and
    a receiver configured to receive a third frame from the first wireless apparatus and a fourth frame from the second wireless apparatus,
    wherein the transmitter is further configured to transmit notification information,
    a length of the third frame is varied based on the notification information,
    a length of the fourth frame is varied based on the notification information, and
    a temporal difference between a first receipt completion time at which the third frame is fully received by the receiver and a second receipt completion time at which the fourth frame is fully received by the receiver is less than a predetermined time length.

12. The apparatus of claim 11,
    wherein the notification information is controlled such that the temporal difference is less than the predetermined time length.

13. The apparatus of claim 11,
    wherein the notification information is information indicating transmission rate of the third frame and transmission rate of the fourth frame.

14. The apparatus of claim 11,
    wherein the length of the third frame and the length of the fourth frame are varied based on a combination of the first wireless apparatus and the second wireless apparatus.

15. The apparatus of claim 11,
    wherein the length of the third frame is varied based on the first wireless apparatus.

16. The apparatus of claim 11, further comprising:
    at least one antenna for transmitting a radio wave.

17. The apparatus of claim 11,
wherein the temporal difference is zero.

18. A wireless communication apparatus comprising:
a transmitter configured to transmit a first frame including first information for a first wireless apparatus and second information for a second wireless apparatus; and
a receiver configured to receive a second frame from the first wireless apparatus and a third frame from the second wireless apparatus,
wherein a length of the second frame is varied based on at least the first information and a length of the third frame is varied based on at least the second information,
a temporal difference between a first receipt completion time at which the second frame is fully received by the receiver and a second receipt completion time at which the third frame is fully received is less than a predetermined time length.

19. The apparatus of claim 18, further comprising:
at least one antenna for transmitting a radio wave.

20. The apparatus of claim 18,
wherein the temporal difference is zero.

\* \* \* \* \*